United States Patent
Deruelle

(10) Patent No.: US 11,890,824 B2
(45) Date of Patent: Feb. 6, 2024

(54) SYSTEM FOR MANUFACTURING THERMOPLASTIC PARTS

(71) Applicant: AIRBUS ATLANTIC, Rochefort (FR)

(72) Inventor: Romain Deruelle, Albert (FR)

(73) Assignee: AIRBUS ATLANTIC, Rochefort (FR)

( * ) Notice: Subject to any disclaimer, the term of this patent is extended or adjusted under 35 U.S.C. 154(b) by 0 days.

(21) Appl. No.: 17/768,201

(22) PCT Filed: Oct. 19, 2020

(86) PCT No.: PCT/EP2020/079404
§ 371 (c)(1),
(2) Date: Apr. 11, 2022

(87) PCT Pub. No.: WO2021/083712
PCT Pub. Date: May 6, 2021

(65) Prior Publication Data
US 2023/0143940 A1    May 11, 2023

(30) Foreign Application Priority Data

Oct. 30, 2019 (FR) .................................. 1912183

(51) Int. Cl.
*B29C 70/44* (2006.01)
*B29C 70/54* (2006.01)
(Continued)

(52) U.S. Cl.
CPC .............. *B29C 70/44* (2013.01); *B29C 35/02* (2013.01); *B29C 70/544* (2021.05);
(Continued)

(58) Field of Classification Search
CPC ............ B29C 70/44; B29C 2043/3655; B29C 2043/3644; B29C 70/548
See application file for complete search history.

(56) References Cited

U.S. PATENT DOCUMENTS 4,942,013 A * 7/1990 Palmer ................ B29C 43/3642
264/511
4,944,822 A * 7/1990 Ishikawa ........... B32B 17/10018
156/286
(Continued)

FOREIGN PATENT DOCUMENTS

WO     WO 2017/166955 A1    10/2017

OTHER PUBLICATIONS

Murray ("Characterisation of Carbon Fiber Reinforced Powder Epoxy Composites for Wind Energy Blades," ECCM18—18th European Conference on Composite Materials Athens, Greece, Jun. 24-28, 2018)) (Year: 2018).*

(Continued)

*Primary Examiner* — Matthew J Daniels
*Assistant Examiner* — Hana C Page
(74) *Attorney, Agent, or Firm* — KOS IP Law LLP

(57) ABSTRACT

A system for manufacturing a thermoplastic part from a blank part having a first moulding member and a second moulding member which are configured to cooperate together. A first heating body configured to heat the first moulding member and conductively heat the blank part. Two thermal insulation members are configured to cooperatively define a closed cavity in which at least the moulding members and the first heating body are arranged. A casing defining an internal volume in which at least the moulding members, the first heating body and the thermal insulation members are arranged, and a suction member is configured to lower the internal pressure in the internal volume to compress the preform part between the moulding members.

18 Claims, 5 Drawing Sheets

(51) Int. Cl.
*B29C 35/02* (2006.01)
*B29C 33/02* (2006.01)
*B29K 105/12* (2006.01)
*B29K 105/00* (2006.01)

(52) U.S. Cl.
CPC .... *B29C 2033/023* (2013.01); *B29K 2105/12* (2013.01); *B29K 2105/253* (2013.01)

(56) References Cited

U.S. PATENT DOCUMENTS

| | | | | |
|---|---|---|---|---|
| 5,236,646 | A * | 8/1993 | Cochran | B29C 70/44 156/286 |
| 2009/0321978 | A1* | 12/2009 | Kurtz | B29C 70/543 264/258 |
| 2010/0139839 | A1* | 6/2010 | Ridgard | B29C 33/10 156/87 |

OTHER PUBLICATIONS

Chong ("Out-of-autoclave scarf repair of interlayer toughened carbon fibre composites using double vacuum debulking of patch," Composites: Part A 107 (2018) 224-234) (Year: 2018).*
Notification R71(3) EPC—Intent to Grant from the European Patent Office (EPO) on corresponding EP application EP20790317.0) dated Mar. 21, 2022.
Notification A97(3) EPC—Decision to Grant from the European Patent Office (EPO) on corresponding EP application (EP20790317.0) dated Jul. 14, 2022.
Search Report from the French Intellectual Property Office on corresponding FR application (FR1912183) dated Aug. 5, 2020.
International Search Report and Written Opinion on corresponding PCT application (PCT/EP2020/079404) from International Searching Authority (EPO) dated Jan. 21, 2021.

* cited by examiner

SYSTEM FOR MANUFACTURING THERMOPLASTIC PARTS

TECHNICAL FIELD

The present invention relates to the field of manufacturing aeronautical parts and is aimed more particularly at a system for manufacturing thermoplastic parts, especially with large dimensions for forming the structure of an aircraft.

By large dimensions it is meant that one of the dimensions of the aeronautical part is greater than 5 m.

In a known manner, an airplane comprises a primary structure through which the mechanical forces pass and a secondary structure mounted to the primary structure. In this respect, the primary structure comprises especially the fuselage, delimiting the body of the airplane and defining its structural envelope, the wing system, comprising the two wings and making it possible to ensure the lift of the airplane in flight, and the empennage, placed at the rear of the airplane and making it possible to ensure its stability.

The primary structure especially comprises several spars. According to the state of the art, a spar has a U-shaped cross-section so as to have high rigidity. In a known manner, a spar is made of a metal material, for example aluminum. However, a metal material has the drawback of being heavy, so nowadays spars are usually made of a composite material.

In a known manner, a composite material spar is made by impregnating reinforcing fibers in a thermosetting matrix. Such a thermosetting matrix is set by polymerization, that is by means of a chemical reaction during which it changes from a liquid or viscous state to a solid state under the effect of heat. When the thermosetting matrix is hot, it is molded into the desired shape, for example into a U-shape for the spars requiring bending of their two side legs. For this purpose, the thermosetting composite part is molded, for example, by thermocompression in an autoclave. In a known manner, an autoclave is a hermetic enclosure in which the pressure and temperature may be controlled and increased so as to press the composite material, between a mold and a counter-mold or between a mold and a vacuum bag as examples, while heating the whole, in order to give the manufactured part its final shape.

Although the autoclave makes it possible to manufacture parts with large dimensions, up to 30 m long, it has the drawback of being extremely energy-consuming and time-consuming. Polymerization is indeed carried out by heating, for example, to 180° C. for a period of more than eight hours. The production rate is therefore low.

Also, there is a desire to replace some thermosetting matrix composite parts with thermoplastic matrix composite parts having a generally shorter manufacturing cycle and good mechanical strength. However, the manufacturing of such thermoplastic matrix composite parts has the drawback of requiring heating to very high temperatures, up to 450° C., in order to consolidate the composite part.

Such a part is formed from reinforcing fibers previously embedded in the thermoplastic matrix, which is known to the person skilled in the art as "prepreg" material. The prepreg material is heated and positioned between two molds (or between a mold and a vacuum bag) for shaping, for example in a press compressing the prepreg material by means of one or more hydraulic cylinders which generate an opposing compression force on the two molds. However, such a manufacturing method has the drawback of requiring perfect alignment of the molds positioned opposite to each other, in order to limit the risks of deformation of the part, as well as an equivalent compression force over the entire length of the molds, so as to compress the entire part, which is complex to implement for manufacturing parts with large dimensions, such as a one-piece spar or fuselage skins. In practice, a press is not capable of manufacturing a part larger than 8 m.

An immediate solution would be to assemble a spar comprising several thermoplastic matrix composite parts manufactured separately in the autoclave or by means of a press. However, assembling several parts reduces the mechanical strength of the spar, which is not desired.

Incidentally, a system for manufacturing thermoplastic matrix composite parts is known from patent application US2012145703A1 wherein the composite part comprises a ferromagnetic material and is placed between two molds sandwiched between a heating blanket and a heating support comprising an inductive heating circuit. A vacuum bag is mounted above the heating blanket to form a closed enclosure where the pressure may be controlled to compress the composite part. A silicone sealing layer may be integrated or mounted to the heating blanket and the heating support to prevent heat loss. The heating blanket and heating support may also form a closed cavity to concentrate the heat. Such a system would allow the manufacture of parts with large dimensions and would be less energy consuming than an autoclave or press. However, in order for the parts to have sufficient mechanical strength, the ferromagnetic material has to comprise an alloy of a specific composition, which is expensive and rare. Further, the ferromagnetic material has to be heated to a temperature at or below its maximum induction heating temperature, the so-called Curie temperature, which substantially varies with the composition of the alloy. Furthermore, the temperature is highly dependent on the distance between the inductive circuit and the ferromagnetic material, which in the case of a complex geometry varies within the part. Such a manufacturing system is therefore complex to implement.

From patent application WO2017166955A1, a manufacturing system and method are also known, wherein a composite part is placed on a mold and covered by a heating surface within a volume closed by a tight film to discharge air.

One of the objectives of the present invention is to provide a system and method for manufacturing thermoplastic parts that allows the manufacture of single-piece parts with large dimensions with high mechanical strength, which is the least energy-consuming and time-consuming possible.

SUMMARY

To this end, the invention relates to a system for manufacturing at least one thermoplastic part for being integrated into a primary structure of an airplane and formed from a blank part comprising reinforcing fibers embedded in a thermoplastic matrix having a melting temperature above 200° C., said manufacturing system comprising:

at least one first molding member and at least one second molding member configured to cooperate together along a vertical axis, said first molding member comprising a first internal face comprising a first impression configured to give a surface condition to an upper face of the blank part, said second molding member comprising a second internal face, opposite to the first internal face, comprising a second impression configured to give a surface condition to a lower face of the blank part, at least one first heating body mounted to the first molding member along the vertical axis and configured to heat the first molding member through conduction to a heating temperature above 200° C., so as to heat the blank part through conduction to a temperature above its melting temperature, at least one power supply device for the first heating body, at least one first thermal insulation member positioned on the first heating body along the vertical axis and at least one second thermal insulation member positioned under the second molding member along the vertical axis, configured to delimit together a closed cavity in which at least the molding members and the first heating body are positioned, at least one flexible sealed envelope delimiting a closed inner volume in which at least the molding members, the first heating body and the thermal insulation members are positioned, and at least one suction member configured to lower the internal pressure in the inner volume of the envelope relative to the external pressure, so as to compress the blank part between the molding members during its heating, in order to manufacture the thermoplastic part.

By virtue of the invention, a thermoplastic part, especially with large dimensions, may be manufactured with a system that is less energy-consuming and less time-consuming than an autoclave or a press. Indeed, the manufacturing system according to the invention makes it possible to carry out localized heating within the closed cavity, which reduces the volume of material to be heated, the heat losses and the temperature rise time of the blank part. In addition, conduction heating allows the blank part to be heated in a precise and controlled manner, unlike the induction heating of prior art. Further, there is no need to provide ferromagnetic material in the composite part, which reduces the manufacturing cost.

According to one preferred aspect, the first heating body is configured to heat the first molding member to a heating temperature at least equal to 350° C. Preferably, the heating temperature is at most equal to 450° C. At this heating temperature, the blank part is advantageously malleable and may be easily modeled to obtain the desired shape of the thermoplastic part and its consolidation.

Preferably, the suction member is configured to generate a pressure difference between the internal pressure in the inner volume and the external pressure of between 1 bar (1000 hPa) and 15 bar (15000 hPa). Preferably, the pressure difference is in the order of 1 bar (1000 hPa) if the manufacturing system according to the invention is placed in the open air and reaches 15 bar (15000 hPa) if the manufacturing system is placed within a press or an autoclave. This range of pressure differences advantageously allows the blank part to be compressed sufficiently to provide the mechanical strength required to be integrated into the primary structure of an airplane. It may be advantageous to place the manufacturing system in an autoclave or press for parts with complex geometry or large thickness. By large thickness, it is meant a part with a thickness greater than 20 mm.

According to one preferred aspect, the manufacturing system comprises at least one second heating body positioned between the second molding member and the second thermal insulation member along the vertical axis and configured to heat the second molding member through conduction to a heating temperature above 200° C., so as to heat the blank part through conduction to a temperature above its melting temperature. Preferably, the second heating body is configured to heat the second molding member to a heating temperature at least equal to 350° C. Preferably, the heating temperature is at most equal to 450° C. Advantageously, heating the blank part on both sides enables a more homogeneously consolidated thermoplastic part to be manufactured, which is particularly desirable for thermoplastic parts with a complex geometry or large thickness. Furthermore, the presence of two heating bodies allows a faster temperature rise, thus saving time in the manufacturing method.

According to one aspect of the invention, the manufacturing system comprises at least one support device positioned under the second thermal insulation member, the envelope being mounted to the support device to delimit together the inner volume. Such a manufacturing system has the advantage of being easy to assemble, the support device forming a base and the envelope being mounted to the support device once the molding members, heating bodies and thermal insulation members are stacked.

According to one aspect of the invention, the second thermal insulation member and the support device form a single entity, which facilitates assembly and reduces the overall size of the manufacturing system.

According to another aspect of the invention, the second molding member and the second thermal insulation member form a single entity. Preferably, the second molding member, the second thermal insulation member and the support device form a single entity, thereby facilitating assembly and reducing the overall size of the manufacturing system.

Preferably, the first thermal insulating member is in the form of a layer of insulating material, preferably comprising a microporous material, more preferably comprising fumed silica. Preferentially, the second thermal insulation member is in the form of a layer of insulating material, preferably comprising a microporous material, preferably still comprising fumed silica. Advantageously, the first thermal insulation member forms a cover covering the first heating body, the edges of which are in contact with the second thermal insulation member, to form a closed insulation cavity. Such a closed cavity is thus easy to form and has reduced dimensions, which limits the energy consumption of the manufacturing system. Preferably, the first thermal insulation member and the second thermal insulation member have a very low thermal conductivity, in the order of 0.03 W/m/K.

Preferably, the layer of insulating material comprises an axial thickness of between 3 mm and 20 mm, large enough to effectively limit heat loss and small enough to limit overall size and remain flexible to conform to the shape of the molding member and optimize heating.

Preferentially, the first molding member is flexible so as to give the blank part its precise geometric shape and a homogeneous surface condition, smoothing out any compression inhomogeneities. Such a flexible first molding member further has the advantage of comprising a reduced mass and greater handleability. Preferably, the second molding member is flexible. By flexible it is meant a change in shape of a few millimeters to a few centimeters.

Preferably, the first heating body is configured to provide a surface power density at least equal to 500 W/m$^2$, preferably at least equal to 1000 W/m$^2$. Preferably, the second heating body is configured to provide a surface power density at least equal to 500 W/m$^2$, preferably at least equal to 1000 W/m$^2$. Advantageously, such a surface power density ensures a heating temperature sufficient to manufacture the thermoplastic part.

Preferentially, the first heating body comprises at least one resistive member embedded in an electrically insulating binder, preferably comprising silicone rubber and/or glass fibers. Preferentially, the second heating body comprises at least one resistive member embedded in an electrically insulating binder, preferably comprising silicone rubber and/or glass fibers.

Preferably, the first heating body comprises several heating portions each configured to provide a heating temperature independent of the others. Advantageously, a blank part comprising a complex geometry or different thicknesses may be consolidated by specifying different heating temperatures for a more uniform result. Preferably, the second heating body comprises several heating portions each configured to provide a heating temperature independent of the others.

According to one preferred aspect, a resistive member is in the form of resistive wires. Advantageously, heat is emitted along the entire length of the resistive wires and not locally. Such a resistive member thus allows more comprehensive heating than the induction heating of prior art.

Preferably, the resistive wires form coils on the surface of the first heating body in contact with the first molding member. Preferably, the resistive wires form coils in the second heating body on the surface of the second heating body in contact with the second molding member. Advantageously, the heating bodies heat the molding members homogeneously and comprehensively, which is not possible with the induction heating of prior art.

Preferably, the manufacturing system comprises at least one thermoregulator, configured to specify the desired heating temperature to at least the first heating body. Also preferably, the manufacturing system comprises at least one thermocouple, configured to be in contact at least with the first heating body, so as to control the heating temperature. Such a thermoregulator and thermocouple advantageously form a temperature feedback control system for controlled consolidation of the blank part. Preferably, the thermoregulator is configured to define different heating temperatures for different heating portions.

The invention also relates to a method for manufacturing at least one thermoplastic part for being integrated into a primary structure of an airplane and formed from a blank part comprising reinforcing fibers embedded in a thermoplastic matrix having a melting temperature above 200° C., the manufacturing method being carried out by means of the manufacturing system previously set forth, said manufacturing method comprising:
- a step of placing the blank part between the first impression of the first molding member and the second impression of the second molding member,
- a step of heating at least the first molding member through conduction to a heating temperature above 200° C. by means of the first heating body so as to heat the blank part through conduction to a temperature above its melting temperature, and
- a step of depressurizing the inner volume during the heating step, by virtue of the suction member, so as to compress the blank part between the molding members, in order to manufacture the thermoplastic part.

BRIEF DESCRIPTION OF THE DRAWINGS

The invention will be better understood upon reading the following description, given solely by way of example, and referring to the appended drawings given as non-limiting examples, in which identical references are given to similar objects and in which.

It should be noted that the figures set out the invention in detail for implementing the invention, said figures may of course serve to further define the invention where appropriate.

DETAILED DESCRIPTION

In a known manner, thermoplastic parts for being integrated into a primary structure of an airplane, such as spars, are formed from blank parts comprising reinforcing fibers, such as carbon fibers, embedded in a thermoplastic matrix, in other words a binder, having a melting temperature above 200° C., in particular of between 350° C. and 450° C.

Figure 1:
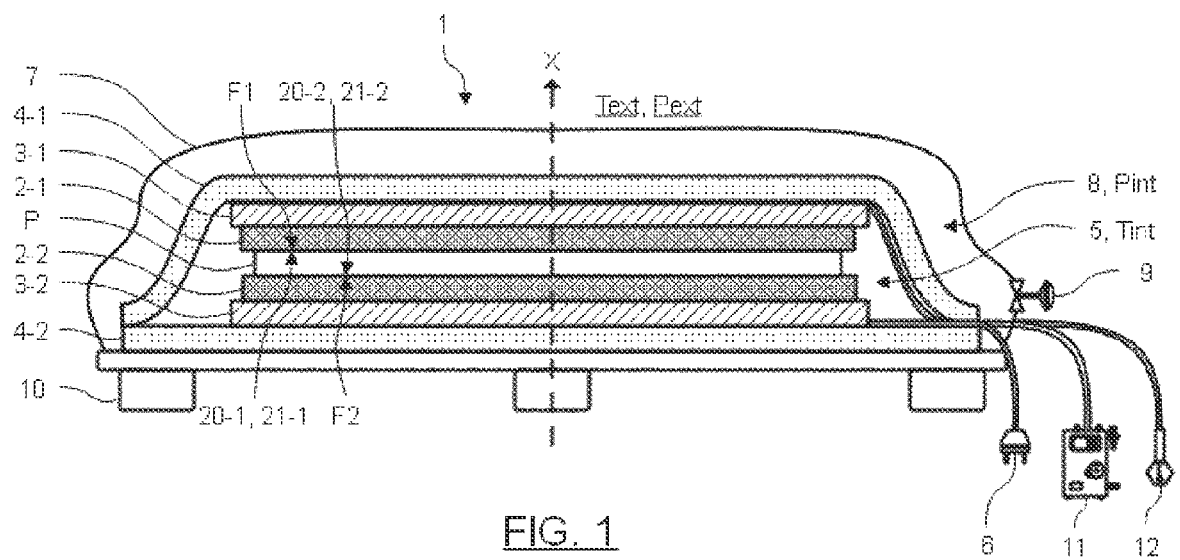
FIG. 1 is a schematic representation in a longitudinal cross-section view of the manufacturing system according to one embodiment of the invention.

With reference to FIG. 1, a system 1 for manufacturing such thermoplastic parts according to the invention is represented, comprising:
- a first molding member 2-1 and a second molding member 2-2 mounted in cooperation along a vertical axis X,
- a first heating body 3-1 and a second heating body 3-2 positioned respectively on the first molding member 2-1 and under the second molding member 2-2
- a first thermal insulation member 4-1 and a second thermal insulation member 4-2 positioned respectively on the first heating body 3-1 and under the second heating body 3-2 and together delimiting a closed cavity 5, and
- a flexible sealed envelope 7 delimiting a closed inner volume 8 in which the molding members 2-1, 2-2, the heating bodies 3-1, 3-2 and the thermal insulation members 4-1, 4-2 are positioned.

Figure 2:
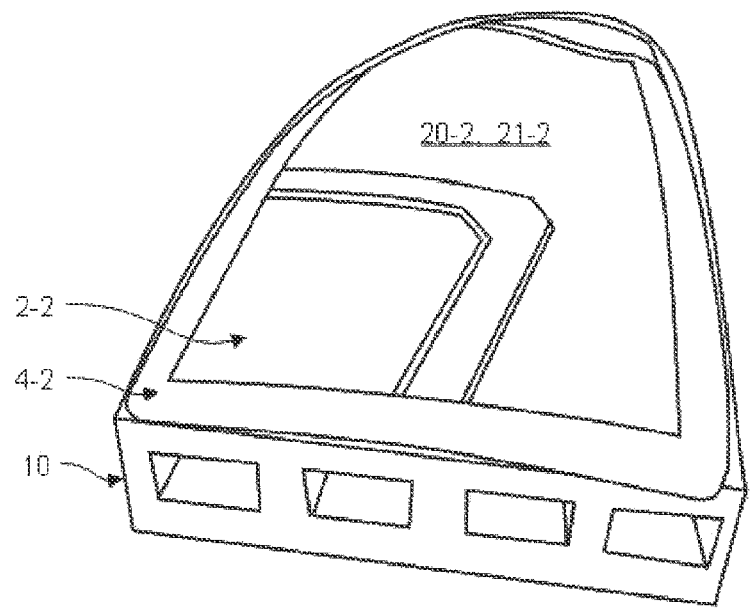
FIG. 2 is a perspective representation of the positioning of the second molding member.
Figure 3:
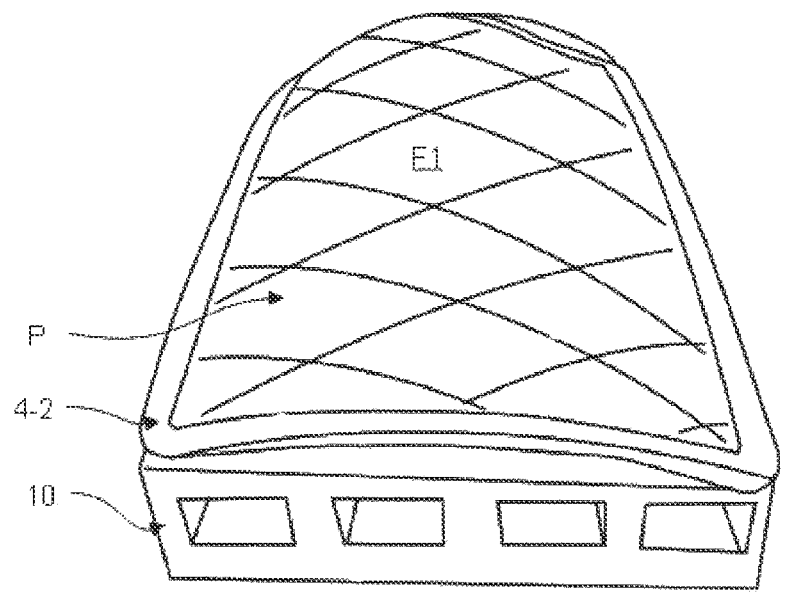
FIG. 3 is a perspective representation of the positioning of the blank part.
Figure 4:
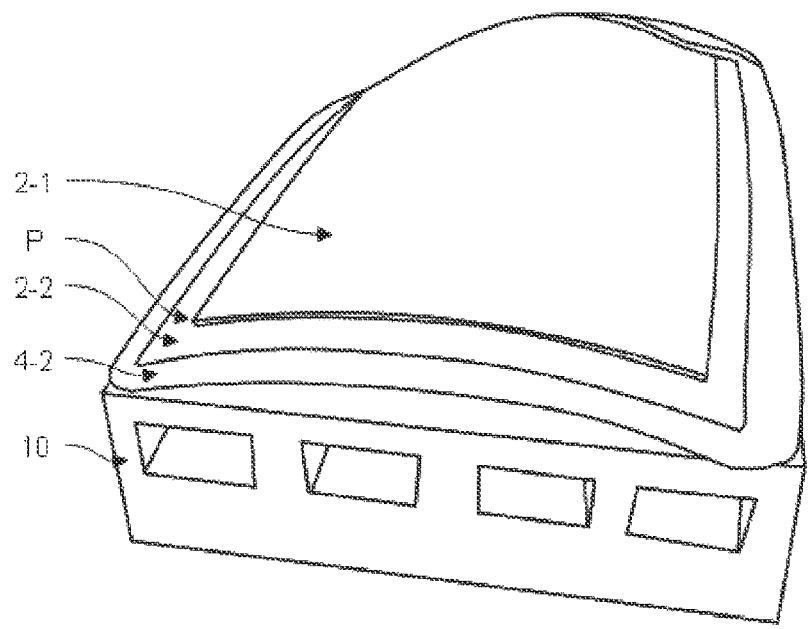
FIG. 4 is a perspective representation of the positioning of the first molding member.
Figure 5:
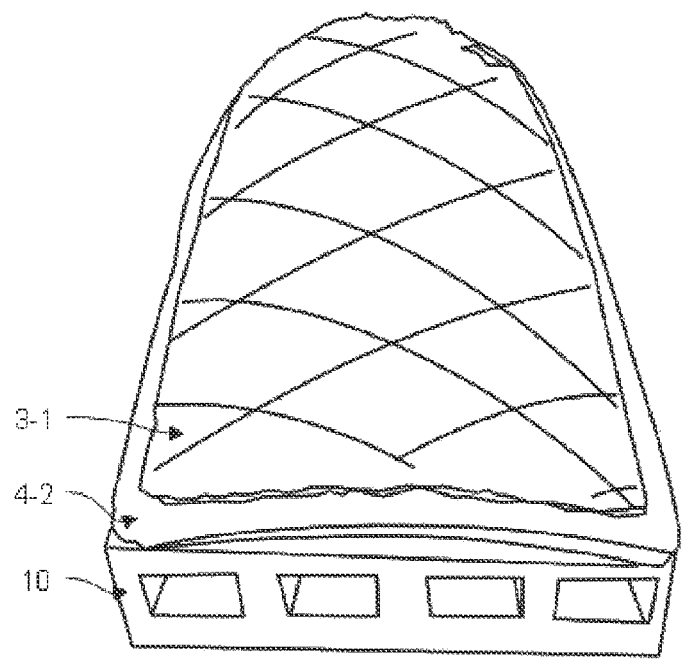
FIG. 5 is a perspective representation of the positioning of the first heating body.
Figure 6:
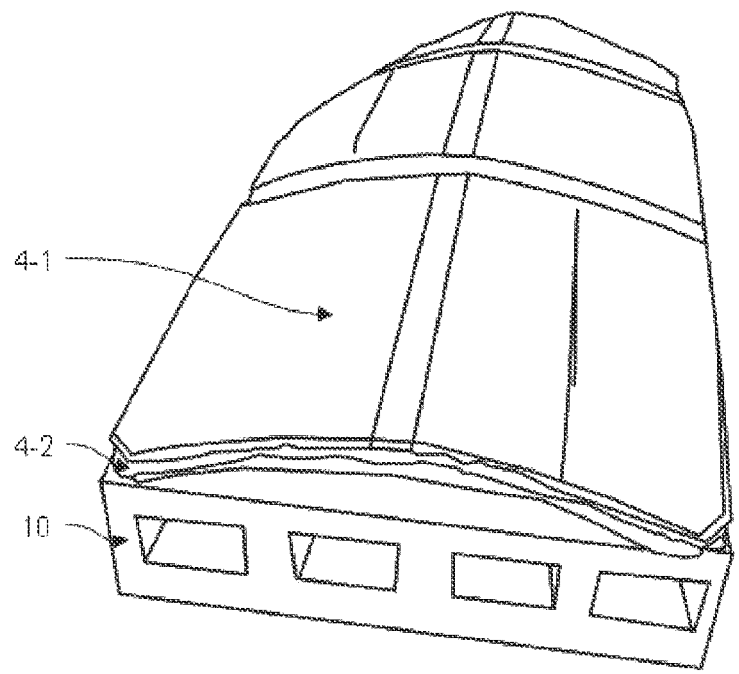
FIG. 6 is a perspective representation of the positioning of the first thermal insulation member.
Figure 7:
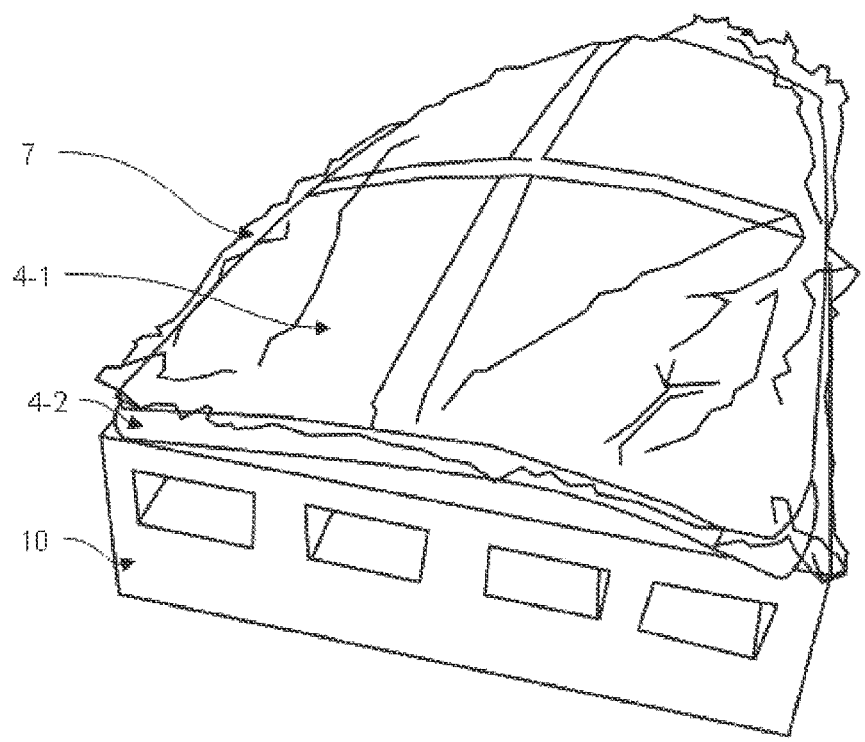
FIG. 7 is a perspective representation of the positioning of the envelope.

In other words, as illustrated in FIGS. 1 to 7, the manufacturing system 1 comprises a stack of axis X comprising from bottom to top:
- the second thermal insulation member 4-2, the second heating body 3-2 and the second molding member 2-2 with reference to FIG. 2,
- the blank part P with reference to FIG. 3,
- the first molding member 2-1 with reference to FIG. 4,
- the first heating body 3-1 with reference to FIG. 5,
- the first thermal insulation member 4-1 with reference to FIG. 6, and
- the envelope 7 with reference to FIG. 7.

The closed cavity 5 is configured to wrap the blank part P, the molding members 2-1, 2-2 and the heating bodies 3-1, 3-2. In turn, the inner volume 8 is configured to wrap the closed cavity 5.

According to the invention, each molding member 2-1, 2-2 comprises an internal face 20-1, 20-2 opposite to each other comprising an impression 21-1, 21-2 configured to give a surface condition to an upper face F1 and to a lower face F2 of the blank part P.

According to the invention, the first heating body 3-1 and the second heating body 3-2 are powered by a power supply source 6 and are configured, respectively, to heat the first molding member 2-1 and the second molding member 2-2 through conduction to a heating temperature above 200° C., preferably of between 350° C. and 450° C., so as to heat the blank part P through conduction to a temperature above its melting temperature. Above its melting temperature, the blank part P is indeed malleable, which facilitates its consolidation.

According to the invention, the thermal insulation members 4-1, 4-2 are configured to limit heat loss to the outside of the closed cavity 5, in other words to maintain the heating temperature Tint inside the closed cavity 5. The envelope 7 comprises at least one suction member 9 configured to lower the internal pressure Pint in the inner volume 8 relative to the external pressure Pext, so as to compress the blank part P between the molding members 2-1, 2-2.

Figure 8:
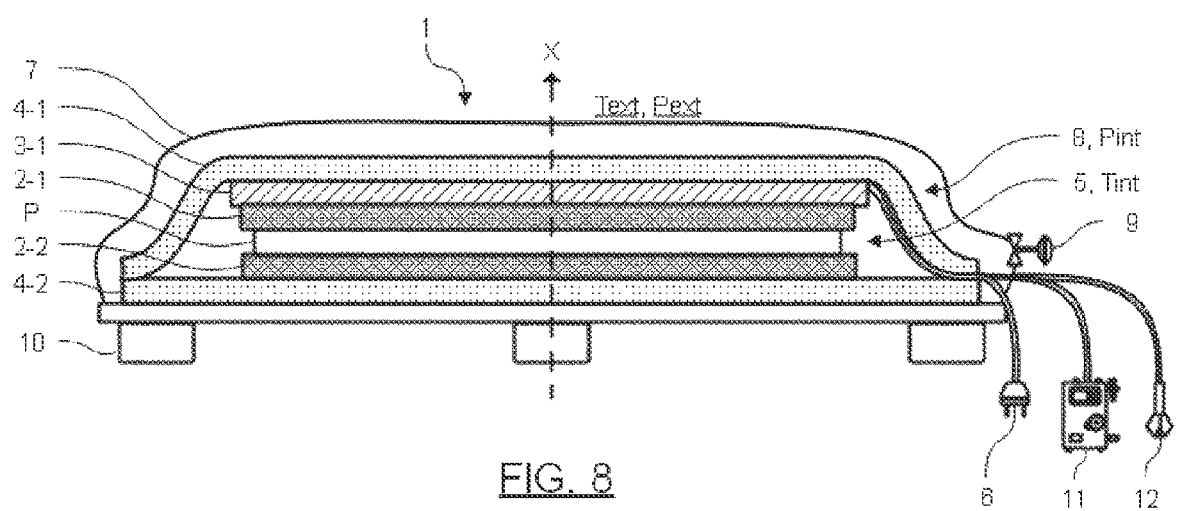
FIG. 8.

In the example shown in FIG. 1, two heating bodies 3-1, 3-2 are used to heat the blank part P on either side, but of course the manufacturing system 1 could comprise only the first heating body 3-1 providing alone the heating. This alternative embodiment is illustrated in FIG. 8. The advantage of heating on both sides is that the blank part P is heated more comprehensively and homogeneously, which may be useful for a blank part P with a complex geometry or large thickness.

Still in the example of FIG. 1, the manufacturing system 1 also comprises a support device 10 positioned under the second thermal insulation member 4-2 and configured to form the base of the manufacturing system 1. In this example, the envelope 7 is also mounted to the support device 10 to delimit together the inner volume 8. However there could of course be no support device 10, the envelope 7 alone delimiting the inner volume 8 in an alternative embodiment represented in FIG. 9.

Still in the example of FIG. 1, the manufacturing system 1 comprises a thermocouple 12 connected to each heating body 3-1, 3-2 and configured to measure the heating temperature Tint. The manufacturing system 1 further comprises a thermoregulator 11 connected to each heating body 3-1, 3-2 and configured to program the desired heating temperature Tint.

The manufacturing system 1 could of course comprise any number of thermocouples 12 and/or thermoregulators 11, in particular more thermocouples 12 located in the closed cavity 5 to control the homogeneity of the heating temperature Tint therein.

It should be noted that in the example of FIG. 1, the manufacturing system 1 allows the manufacture of a single blank part P. However, the manufacturing system 1 could of course comprise more than two molding members 2-1, 2-2, such as four molding members 2-1, 2-2 cooperating in twos to manufacture two blank parts P simultaneously. The number of heating bodies 3-1, 3-2 and the number of thermal insulation members 4-1, 4-2 would then have to be adapted accordingly. In the example of two simultaneously manufactured blank parts P, this number may be doubled so as to form two independent manufacturing systems 1 one above the other along the axis X. Alternatively, one or more heating bodies 3-1, 3-2 and/or thermal insulation members 4-1, 4-2 could be shared for the manufacture of several blank parts P, to optimize the manufacturing cost.

The structural and functional characteristics of the molding members 2-1, 2-2, of the heating bodies 3-1, 3-2, of the thermal insulation members 4-1, 4-2, of the support device 10 and finally of the envelope 7 are described in more detail below.

The molding members 2-1, 2-2 are first described with reference to FIGS. 2 to 4.

In the example of FIGS. 2 and 4, each molding member 2-1, 2-2 is in the form of a mold with a small axial thickness, namely between 0.2 mm and 4 mm. Such a mold is known to the person skilled in the art as a "caul plate" and has the advantage of being flexible, that is of being able to deform slightly under the effect of a stress, for example a compression stress. Thus, in the case of a compression with some inhomogeneities, a caul plate, despite its general rigidity, may be slightly deformed, namely by a few millimeters to a few centimeters, in order to give its surface condition to the whole of the upper face F1 or lower face F2 of the blank part P and not only to the zones of greatest compression. Of course one or more molding members 2-1, 2-2 could however be in the form of a rigid mold. In particular, the second molding member 2-2 configured to be under the blank part P could be in the form of a rigid mold to provide a support function, in addition to or in the absence of the support device 10.

Preferably, each molding member 2-1, 2-2 comprises a material resistant to temperatures of up to 450° C., preferably of thermal expansion substantially equal to that of the blank part P. Such a material may be stainless steel, aluminum, steel or nickel as non-limiting examples. Of course, the first molding member 2-1 may comprise a different material than the second molding member 2-2.

Furthermore, as illustrated in FIGS. 1 to 4, the molding members 2-1, 2-2 together form an open housing for the blank part P, like a waffle iron, so that excess thermoplastic matrix may be discharged and the compaction stresses pass through the blank part P. In the example of FIGS. 1, 2 and 4, the first impression 21-1 of the first molding member 2-1 and the second impression 21-2 of the second molding member 2-2 are thus not in contact with each other so that excess resin may be discharged at the side edges of the blank part P. Preferably, as illustrated in FIG. 4, the molding members 2-1, 2-2 are configured to have a surface area of slightly larger dimension than the blank part P, so as not to restrain the side edges of the blank part P and thus allow for better compression.

The first heating body 3-1 is described below with reference to FIG. 5, this description being valid for the second heating body 3-2 and any possible additional heating body of the manufacturing system 1.

As illustrated in FIG. 5, the first heating body 3-1 is in the form of a layer in direct contact with the first molding member 2-1 (or the second molding member 2-2 in the case of the second heating body 3-2), known as a "heating blanket", so as to provide efficient conductive heating. Preferably, the first heating body 3-1 is flexible so as to adopt the shape of the first molding member 2-1.

Still with reference to FIG. 5, the first heating body 3-1 comprises a resistive member, that is one that generates heat by Joule effect, which is integrated in an electrically insulating binder so as not to propagate electricity outside the resistive member. Such a first heating body 3-1 is known to the person skilled in the art, for example under the trade name "FGH and SXH High Temperature Composite Curing Blankets" from the BRISKHEAT company. Preferably, the resistive member covers the entire surface of the first heating body 3-1 so as to provide homogeneous heating. Of course the first heating body 3-1 may also comprise several resistive members covering together the entire surface of the first heating body 3-1. For example, the first heating body 3-1 may comprise glass fiber reinforced silicone rubber into which resistive wires are embroidered. Preferably, the resistive wires are arranged in the form of coils so as to cover the entire surface of the first heating body 3-1. However the resistive wires may of course be positioned heterogeneously or even in any desired manner. Of course also the resistive member could be in another form.

Preferably, the first heating body 3-1 is configured to provide a surface power density at least equal to 500 W/m$^2$, preferably at least equal to 1000 W/m$^2$ so that the heating temperature Tint in the closed cavity 5 is at least equal to 200° C., preferably of between 350° C. and 400° C. The heating temperature Tint may be programmed by the thermoregulator 11 and controlled by the thermocouple 12.

Figure 10:
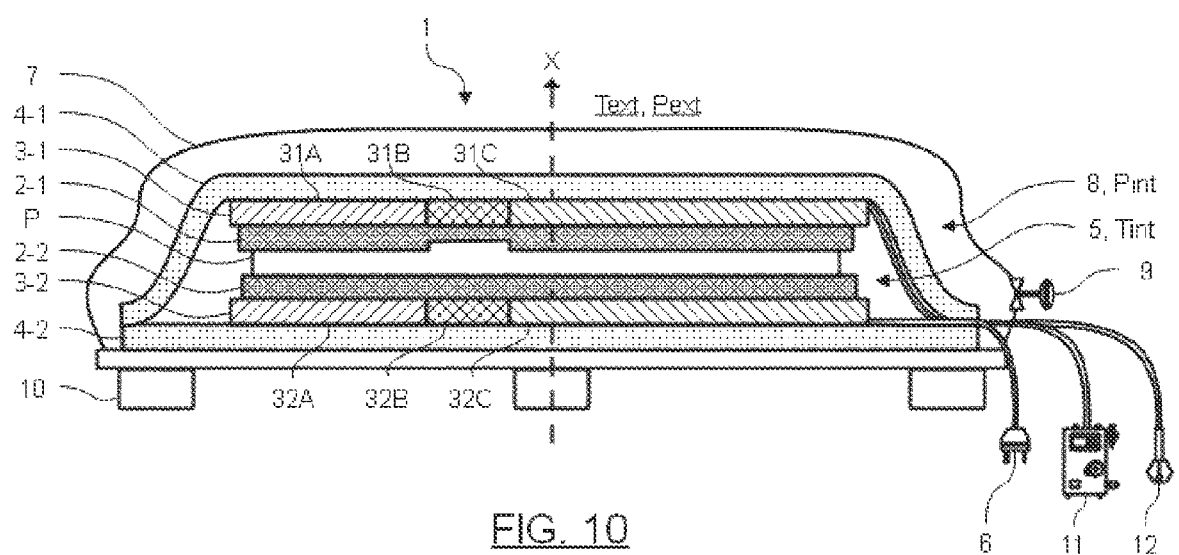
FIG. 10 are schematic representations in a longitudinal cross-section view of the manufacturing system according to alternative embodiments of the invention.

With reference to FIG. 10 illustrating an alternative embodiment of the invention, the first heating body 3-1 comprises several heating portions 31A, 31B, 31C programmed independently of each other by the thermoregulator 11, so as to be able to provide a different surface power density. This alternative embodiment is of real interest in the case of a blank part P with a variable thickness, such as that represented in FIG. 10. In this example, the blank part P comprises an extra thickness and the first molding member 2-1 comprises three heating portions 31A, 31B, 31C, a second heating portion 31B being positioned in the axial extension of the extra thickness, the first and third heating portions 31A, 31C covering the rest of the surface of the blank part P. In this example the second heating portion 31B is configured to provide a greater amount of heat than the first and third heating portions 31A, 31C so that the extra thickness is homogeneously consolidated, especially in the core. It should be noted that in this example, the second heating body 3-2 also comprises three heating portions 32A, 32B, 32C symmetrical to the heating portions 31A, 31B, 31C of the first heating body 3-1.

The thermal insulation members 4-1, 4-2 are described hereinafter with reference to FIG. 6.

As illustrated in FIG. 6, each thermal insulation member 4-1, 4-2 is preferably in the form of an insulating layer with a small axial thickness of between 3 mm and 20 mm. Such a thermal insulation member 4-1, 4-2 has the advantage of being flexible and thus of adopting the shape on which it is mounted.

Still with reference to FIG. 6, each thermal insulation member 4-1, 4-2 has a surface area of larger dimension than the heating bodies. Advantageously, the side edges of the first thermal insulation member 4-1 may thus bend to be in contact with the side edges of the second thermal insulation member 4-2, thus forming the closed cavity 5 in a simple manner.

Of course, the closed cavity 5 could be formed in other ways. For example, the side edges of the thermal insulation members 4-1, 4-2 could be connected to each other by gluing, sewing or in some other way.

Each thermal insulation member 4-1, 4-2 also comprises a material with a low thermal conductivity, preferably less than 0.05 W/m/K, so as to effectively limit heat loss and maintain the desired heating temperature Tint. The material is furthermore preferably microporous. Such a material may be fumed silica as an example.

Advantageously, the thermal insulation members 4-1, 4-2 make it possible to manufacture thermoplastic parts with much less energy consumption than the autoclave of prior art. The thermal insulation members 4-1, 4-2 have the further advantage of accelerating the temperature rise of the blank part P.

The support device 10 is described below with reference to FIGS. 2 to 7.

As illustrated in FIGS. 2 to 7, the support device 10 is in the form of a base configured to support the mass of the manufacturing system 1. The support device 10 may comprise telescopic legs to be raised to the desired height or not.

By virtue of the thermal insulation members 4-1, 4-2, the support device 10 is advantageously not in contact with the heating temperature Tint. The support device 10 thus preferably comprises a material that is resistant to temperatures in the order of 70° C., which is advantageously economical and durable. However, the support device 10 could of course comprise another material. In particular, according to an alternative embodiment of the invention (not represented), the second thermal insulation member 4-2 and the support device form a single entity in order to limit the overall size. In other words, the first thermal insulation member 4-1 and the support device 10 together form the closed cavity 5. In this embodiment, the support device 10 comprises a material that is both resistant to temperatures of up to 400° C. and insulating, such as an alloy comprising alumina and silicon dioxide known to the skilled person as "sizal".

Further to its support function, the support device 10 is preferably also configured to give the overall form of the blank part P. More precisely, the molding members 2-1, 2-2 being preferably slightly flexible, the support device 10 makes it possible to give the overall shape of the blank part P while the molding members 2-1, 2-2 give the surface condition of the lower face F2 and the upper face F2 of the blank part P. In the example of FIGS. 2 to 7, the support device 10 is thus in the form of a curved base for manufacturing a curved thermoplastic part. Of course, the support device may be of any shape, such as planar or of more complex geometry.

The envelope 7 is described below with reference to FIGS. 7 and 9.

Figure 9:
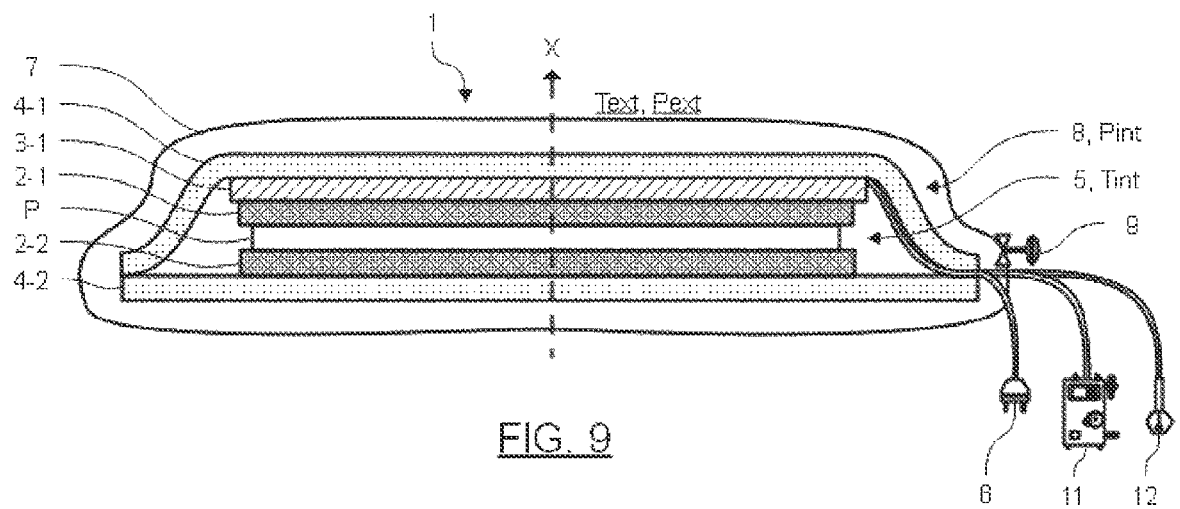
FIG. 9.

As illustrated in FIGS. 7 and 9, the envelope 7 is preferably in the form of a flexible membrane, known to the person skilled in the art as "bagging". Like the support device 10, by virtue of the thermal insulation members 4-1, 4-2, the envelope 7 is advantageously not in contact with the heating temperature Tint. The envelope 7 thus preferably comprises a material resistant to temperatures of up to 180° C., such as nylon for example. Such a material is advantageously economical and durable.

In the example of FIG. 7, the envelope 7 is mounted to the support device 10 so as to delimit together the inner volume 8. A gasket may be added to the junction between the envelope 7 and the support device 10 for sealing. According to an alternative embodiment illustrated in FIG. 9, the envelope 7 alone forms the inner volume 8, in the absence of the support device 10.

As illustrated in FIGS. 1 and 9, the manufacturing system 1 comprises at least one suction member 9 configured to generate a pressure difference between the internal pressure Pint in the inner volume 8 and the external pressure Pext, preferably between 1 bar (1000 hPa) and 15 bar (15000 hPa). Advantageously, this pressure difference makes it possible to compress the blank part P, which is otherwise heated and therefore malleable, so as to manufacture a consolidated thermoplastic part with mechanical strength meeting aeronautical requirements. Preferably, the pressure difference is in the order of 1 bar (1000 hPa), which makes it possible to manufacture a thermoplastic part of simple geometry. However, for more complex geometries or for parts with a large thickness, the pressure difference may increase to 15 bar (15000 hPa). The manufacturing system 1 is then preferably placed within an autoclave or press.

Preferably, the suction member 9 is in the form of a suction valve mounted in a port of the envelope 7 and connected to a pumping member, such as a vacuum pump. The suction valve may also be mounted in a port of the support device 10. Of course, the suction member 9 may be in any other form, as long as it generates the desired pressure difference.

A method for manufacturing a thermoplastic part by means of the manufacturing system 1 according to the invention set forth previously is described below.

In a first step, as illustrated in FIGS. 1 to 7, the blank part P is placed between the first impression 21-1 of the first molding member 2-1 and the second impression 21-2 of the second molding member 2-2. For this purpose, the manufacturing system 1 is assembled by stacking the second thermal insulation member 4-2, the second molding member 2-2, the blank part P, the first molding member 2-1, the first heating body 3-1, the first thermal insulation member 4-1 and the envelope 7 from bottom to top with reference to FIG. 7. At the end of this placement step, the thermal insulation members 4-1, 4-2 form a closed cavity 5 in which the blank part P is positioned and the envelope 7 forms an inner volume 8 in which the closed cavity 5 is positioned.

The manufacturing method then comprises a step of heating the heating bodies 3-1, 3-2 to a heating temperature Tint above 200° C. so as to heat the blank part P through conduction to a temperature above its melting temperature. Once the melting temperature is exceeded, the blank part P becomes malleable.

The manufacturing method also comprises a depressurization step, carried out during the heating step, during which the internal pressure Pint of the inner volume 8 is reduced by virtue of the suction member 9, so as to compress the then malleable blank part P between the molding members 2-1, 2-2. The air bubbles in the blank part P are then eliminated and a consolidated thermoplastic part may thus be manufactured.

By virtue of the invention, a thermoplastic part, especially with large dimensions, may be manufactured with a mechanical strength that meets the aeronautics requirements. Conduction heating makes it possible, especially, to heat the blank part P homogeneously, completely and controllably, by virtue of the heating bodies 3-1, 3-2 combined with the thermoregulators 11 and thermocouples 12. The heating bodies 3-1, 3-2 may further comprise several separately controllable heating portions 31A, 31B, 31C, 32A, 32B, 32C for homogeneously consolidating parts having complex geometry and varying thicknesses.

The manufacturing system 1 according to the invention is furthermore less energy-consuming than the autoclave of prior art by virtue of localized heating and compression by means of the thermal insulation members 4-1, 4-2 and the envelope 7. The manufacturing system 1 is also less time-consuming because the heating rate is increased by virtue of the thermal insulation members 4-1, 4-2 which limit heat loss. Finally, the manufacturing system 1 is economical in that materials with low heat resistance may be used especially for the envelope and the support device.

The invention claimed is:

1. A system for manufacturing at least one thermoplastic part formed from a blank part comprising reinforcing fibers embedded in a thermoplastic matrix having a melting temperature above 200° C. for integrating into a primary structure of an aircraft, said manufacturing system comprising:
a first molding member and a second molding member that cooperate along a vertical axis, wherein said first molding member comprising a first internal face comprising a first impression configured to give a surface condition to an upper face of the blank part and said second molding member comprising a second internal face comprising a second impression configured to give a surface condition to a lower face of the blank part,
a first heating body mounted to the first molding member along the vertical axis and configured to heat the first molding member through conduction to a heating temperature above 200° C. so as to heat the blank part through conduction to a temperature above the blank part's melting temperature,
a power supply device for the first heating body,
a first thermal insulation member positioned on the first heating body along the vertical axis and a second thermal insulation member positioned under the second molding member along the vertical axis, the first and second thermal insulation members defining an inner cavity in which the first and second molding members and the first heating body are positioned,
a flexible sealed envelope delimiting a closed volume in which the inner cavity having the first and second molding members, the first heating body, and the first and second thermal insulation members are positioned, and
a suction member configured to lower internal pressure in the closed volume of the flexible sealed envelope relative to external pressure external to the flexible sealed envelope so as to compress the blank part between the first and second molding members during heating of the blank part.

2. The system for manufacturing according to claim 1, wherein the first heating body is configured to heat the first molding member to a heating temperature of at least to 350° C.

3. The system for manufacturing according to claim 1, wherein the suction member is configured to generate a pressure difference between the internal pressure in the closed volume and the external pressure of between 1 bar and 15 bar.

4. The system for manufacturing according to claim 1, further comprising a second heating body positioned between the second molding member and the second thermal insulation member along the vertical axis the second heating body configured to heat the second molding member through conduction to a heating temperature above 200° C. so as to heat the blank part through conduction to a temperature above the blank part's melting temperature.

5. The system for manufacturing according to claim 1, further comprising a support device positioned under the second thermal insulation member, the flexible sealed envelope being mounted on the support device to delimit together the closed volume.

6. The system for manufacturing according to claim 5, wherein the second thermal insulation member and the support device form a single entity.

7. The system for manufacturing according to claim 1, wherein the second molding member and the second thermal insulation member form a single entity.

8. The system for manufacturing according to claim 1, wherein the first thermal insulation member is a layer of insulating material.

9. The system for manufacturing according to claim 8, wherein the layer of insulating material comprises an axial thickness of between 3 mm and 20 mm.

10. A system for manufacturing at least one thermoplastic part formed from a blank part comprising reinforcing fibers embedded in a thermoplastic matrix having a melting temperature above 200° C. for integrating into a primary structure of an aircraft, said manufacturing system comprising:
- a first molding member, comprising a first internal face with a first impression configured to give a surface condition to an upper face of the blank part and a second molding member comprising a second internal face with a second impression configured to give a surface condition to a lower face of the blank part, the first and second molding members being stacked along a vertical axis,
- a first heating body mounted to the first molding member along the vertical axis and a second heating body positioned under the second molding member,
- a first thermal insulation member positioned on the first heating body along the vertical axis and a second thermal insulation member positioned under the second molding member along the vertical axis, the first and second thermal insulation members defining an inner cavity in which the first and second molding members and the first and second heating bodies are positioned,
- a flexible sealed envelope forming a closed volume and sealing the inner cavity in which the first and second molding members, the first and second heating bodies, and the first and second thermal insulation members are positioned, and
- a suction member configured to lower internal pressure in the closed volume of the flexible sealed envelope relative to external pressure external to the flexible sealed envelope so as to compress the blank part between the first and second molding members during heating of the blank part.

11. The system for manufacturing according to claim 10, wherein the first and second molding members are completely located inside the inner cavity.

12. The system for manufacturing according to claim 10, wherein the flexible sealed envelope is resistant to temperatures of up to 180° C.

13. The system for manufacturing according to claim 10, further comprising a support device positioned under the second thermal insulation member, the flexible sealed envelope being mounted on the support device.

14. The system for manufacturing according to claim 13, wherein the second thermal insulation member and the support device form a single entity.

15. The system for manufacturing according to claim 10, wherein the second molding member and the second thermal insulation member form a single entity and both are located in the sealed envelope.

16. The system for manufacturing according to claim 10, further comprising a power supply device for supplying power to at least the first heating body.

17. A method for manufacturing at least one thermoplastic part for integrating into a primary structure of an aircraft, the manufacturing method being carried out by using the system for manufacturing comprising:
- a first molding member and a second molding member that cooperate along a vertical axis, wherein said first molding member comprising a first internal face comprising a first impression configured to give a surface condition to an upper face of the blank part and said second molding member comprising a second internal face comprising a second impression configured to give a surface condition to a lower face of the blank part,
- a first heating body mounted to the first molding member along the vertical axis and configured to heat the first molding member through conduction to a heating temperature above 200° C. so as to heat the blank part through conduction to a temperature above the blank part's melting temperature,
- a power supply device for the first heating body,
- a first thermal insulation member positioned on the first heating body along the vertical axis and a second thermal insulation member positioned under the second molding member along the vertical axis, the first and second thermal insulation members defining an inner cavity in which the first and second molding members and the first heating body are positioned,
- a flexible sealed envelope delimiting a closed volume in which the inner cavity having the first and second molding members, the first heating body, and the first and second thermal insulation members are positioned, and
- a suction member configured to lower internal pressure in the closed volume of the flexible sealed envelope relative to external pressure external to the flexible sealed envelope so as to compress the blank part between the first and second molding members during heating of the blank part;

wherein said method comprising:
- a step of placing the blank part between the first impression of the first molding member and the second impression of the second molding member,
- a step of heating the first molding member with the first heating body through conduction to a heating temperature above 200° C. so as to heat the blank part through conduction to a temperature above the blank part's melting temperature, and
- a step of depressurizing the closed volume during the heating step so as to compress the blank part between the first and molding members.

18. The method according to claim 17, wherein the system for manufacturing further comprising a second heating body positioned between the second molding member and the second thermal insulation member along the vertical axis.

* * * * *